(12) United States Patent
Stoller et al.

(10) Patent No.: US 8,927,923 B2
(45) Date of Patent: Jan. 6, 2015

(54) TEST FORMATION APPARATUS FOR A DOWNHOLE TOOL

(75) Inventors: Christian Stoller, Princeton Junction, NJ (US); Richard J. Radtke, Princeton Junction, NJ (US); Raju M. Eason, Stafford, TX (US); Scott H. Fricke, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 13/419,303

(22) Filed: Mar. 13, 2012

(65) Prior Publication Data

US 2012/0235030 A1 Sep. 20, 2012

Related U.S. Application Data

(60) Provisional application No. 61/452,286, filed on Mar. 14, 2011.

(51) Int. Cl.
*G01V 5/04* (2006.01)
*G01V 5/10* (2006.01)

(52) U.S. Cl.
CPC .................................... *G01V 5/101* (2013.01)
USPC ........................................................ 250/256

(58) Field of Classification Search
CPC ....................................................... G01V 5/04
USPC ..................... 250/252.1, 269.4, 256, 269.3
See application file for complete search history.

(56) References Cited

U.S. PATENT DOCUMENTS

| | | | | |
|---|---|---|---|---|
| 5,182,955 A | * | 2/1993 | Minette | 73/865.6 |
| 5,548,116 A | * | 8/1996 | Pandelisev | 250/256 |
| 8,327,683 B2 | | 12/2012 | Radtke et al. | |
| 2010/0180662 A1 | | 7/2010 | Radtke et al. | |
| 2011/0024613 A1 | * | 2/2011 | Roberts | 250/256 |

FOREIGN PATENT DOCUMENTS

WO 2010002727 A2 1/2010

* cited by examiner

*Primary Examiner* — David Porta
*Assistant Examiner* — Faye Boosalis
(74) *Attorney, Agent, or Firm* — Cathy Hewitt

(57) ABSTRACT

An insert apparatus for use in a test formation for a downhole nuclear spectroscopy tool includes an outer liner, and an inner liner defining a cylindrical borehole having a diameter such that the downhole nuclear spectroscopy tool is receivable therein. There is fill material between the outer liner and the inner liner, the material including a formation base material and an elemental standards material. The outer liner, the inner liner, and the fill material are configured such that an elemental standard measurement derived from a test using the insert apparatus is equivalent to an elemental standard measurement from a selected formation.

25 Claims, 6 Drawing Sheets

TEST FORMATION APPARATUS FOR A DOWNHOLE TOOL

PRIORITY

This application claims the benefit and priority date of Provisional Application, Ser. No. 61/452,286, filed Mar. 14, 2011.

TECHNICAL FIELD

The present disclosure relates to the field of tools for well logging, and more particularly a test apparatus for well logging tools.

BACKGROUND

Characterization of nuclear spectroscopy tools mainly includes acquiring spectra in a variety of known test formations. For each elemental spectral response to be extracted from a spectrum, at least one specific test formation is currently used. Prior reference formations are primarily aimed at the characterization of neutron porosity, gamma-gamma density, and natural gamma ray measurements rather than the spectroscopy of neutron induced gamma-rays.

Conventional test formations used for the characterization of neutron porosity tools are cylinders approximately 5 ft in diameter and 5 ft in height, and are filled with a uniform distribution of test material. The dimensions of these formations are chosen to be large enough that any conceivable radiation detected by the tool is entirely contained within the test formation during its trip from source to detector. In combination with the uniformity of the test formations, the result is an environment which the tool interprets as being an infinitely large homogeneous formation typical of what might be encountered downhole. Formations of this large size can be used for the characterization of spectroscopy tools that detect neutron induced gamma-rays.

While convenient for typical measurements, the physical size of conventional test formations presents some difficulties. For example, the tank constructed to contain the formation is relatively expensive. The volume of material used to fill the formation is large, which limits the possibility of using costly, high-purity materials. Rather, quarried rock is generally used; locating rock with an appropriate composition and adequate purity is challenging and, in some cases, potentially impossible. Further, during tool characterization, many formations are transferred into and out of a small number of test pits. Large formations use heavy lifting equipment and pose safety hazards as they are moved around. Finally, storage is be provided for the many formations used in tool characterization, and the larger the dimensions of the formations are, the more difficult it is to find space for them.

The use of materials placed in proximity to a nuclear tool to influence its measurement, but which are not effectively infinite to the sensors in the tool, is also well known. The primary example is the use of inserts or sleeves during the calibration of nuclear tools. Materials of this type are used to calibrate both wireline and logging-while-drilling tools for density, neutron porosity, and neutron-gamma density measurements, for example. These materials can be engineered to achieve specific responses, see for example, U.S. Patent Application, Publication Number 2010/0180662, assigned to the same assignee as the present application, which is hereby incorporated by reference in its entirety.

Based on the foregoing, it would be useful in the industry to have a test formation apparatus which would address the size, cost and storage issues while still providing varied test formations for accurate elemental gamma-ray spectral responses.

SUMMARY

Some functions of the test formation apparatus described in this disclosure are to obtain an accurate spectral shape of the gamma-ray response for one or more particular elements representative of the response to an infinite homogeneous formation, to determine the sensitivity to the presence of elements(s) of interest, to provide relatively high yield(s) (fractional spectral contributions) in the detected spectrum from the elements(s) of interest to help minimize measurement acquisition time and to improve the accuracy and precision of the result, to lower the background contributed to the detected spectrum by other materials which are not of interest and to help ensure that such background can be accurately subtracted from the spectrum, reducing the volume of material used to achieve the preceding goals, and helping to ensure that such a test formation is stable and will not leak or otherwise change over a lifetime use of ten, twenty, or more years.

This disclosure provides an improved test formation apparatus, and methods to make and use such new test formations. In one embodiment, a smaller formation insert or sleeve is constructed, which fits around a downhole tool. The insert may be placed within a water tank and the downhole tool placed in it, or the sleeve may be temporarily attached to the tool and the insert-tool assembly lowered into a water tank. With this design, measurements in the insert/water tank combination can reproduce the spectral shape of the elemental signatures even though the radiation may not be entirely contained in the insert. Useful inserts may be formed from a material that will balance mechanical requirements, physics and chemistry requirements as well as cost considerations, and are designed with a specific geometry, depending on the tools to be tested. Inserts will include formation base material between liners or walls, and the internal material includes at least one elemental standard material to (re)produce the elemental signature standard.

Unexpectedly, the test formation apparatus including an insert apparatus and an outer fluid filled tank allows derivation of a signature gamma-ray standard response spectrum (called a "standard") to appear to be from an infinite formation when the insert comprises an extent of formation fill material that does not ordinarily appear infinite to tool sensors. Fill materials useful for the inserts are those materials wherein a standard derived from the test formation using that insert is equivalent to a standard from an actual earth formation. In addition, the count rate from the formation due to the element of interest has to be high enough that measurements of reasonable duration are possible and subtraction of unwanted elemental signatures can be performed accurately. Cost of materials can also be a factor, but this factor is reduced because of the reduced amount of material used, which allows materials of increased purity to be used at a reasonable cost.

In one embodiment, there is a test formation for a downhole nuclear spectroscopy tool. The test formation may include an outer fluid tank, and includes an insert apparatus for inserting a tool into a cylindrical borehole in its center. The insert is formed of an outer liner and an inner liner, with a quantity of fill material, including at least one formation base material and at least one elemental standards material, there between. It should be understood that the formation base material and the elemental standards material may have the same composition. The insert apparatus has an outer geometry which may be selected to complement the tool or tools to be tested there-with, and an inner cylindrical borehole, defined by the inner liner, with a diameter such that at least one downhole nuclear spectroscopy tool fits within the borehole. The test formation apparatus provided allows for an elemental standard measurement derived from a test using the insert apparatus to be equivalent to the standard measurement from an actual infinite earth formation for that element.

In some applications, the insert apparatus may be usable with more than one tool. Specifically the diameter of the inner cylindrical borehole may be large enough to accommodate at least one wire line logging tool and at least one LWD type tool. Further, the outer diameter of the insert may be such that the derived standard is representative of an infinite formation and, in an embodiment, have at least 80% of the signal thereof.

The geometry of the insert apparatus may depend on the size and geometry of the tools being used with the insert. For example, the length of the insert may be at least several centimeters beyond the tool's source and the top of the furthest spaced detector thereon. The inner diameter of the insert may be significantly greater than the outer diameter of the tool. In one embodiment, the inner diameter of the insert is the same as that of the borehole in which the tool is designed to log.

Another test formation insert apparatus described herein may comprise an exterior shell or liner, an inner liner also called a borehole liner, and formation (or "fill") material between the exterior shell and an inner liner. The formation material may comprise a base material similar to that found in an actual earth formation, such as sandstone, limestone, or dolomite, and at least one elemental material, for which a standard is to be determined. Elemental standards of interest include Gd and Sm, Ti, Fe, Al, S, Mn, Na, and P to name a few. Representative materials to be included in the formation material may include, but are not limited to, $MnCO_3$, $CaCO_3$, $CaSO_4$, $MnO_2$, $Na_2CO_3$, $Na_2HCO_3$, $Ca_2P_2O_7$, $Ca(HPO_4)$. $2H_2O$, $Ca(H_2PO_4)_2$. Such "elemental standards" materials may be powdered and distributed in the formation material, may be included in a pore fluid within the formation material, or may be a part of the formation base material itself, e.g., quartz. Each formation insert apparatus has a fill material that is specific to the element being tested and the type of formation of interest; however, that is not to say that the insert apparatus cannot be emptied and refilled with a different fill material containing a different elemental material.

This disclosure also provides methods of making and using the test formation insert apparatus. In various embodiments herein, the volume of the insert, and hence its mass, can be reduced by approximately a factor of eight compared to a quasi-infinite full size formation. This reduction significantly decreases the cost of the insert relative to a complete formation. It allows the use of higher purity materials than would otherwise be possible. The techniques used to design the insert can also be employed to engineer inserts for specific purposes that would be difficult or impossible with quarried rock. The smaller dimensions and mass of the inserts alleviates many of the problems associated with lifting and storing them.

DETAILED DESCRIPTION

Figure 1:
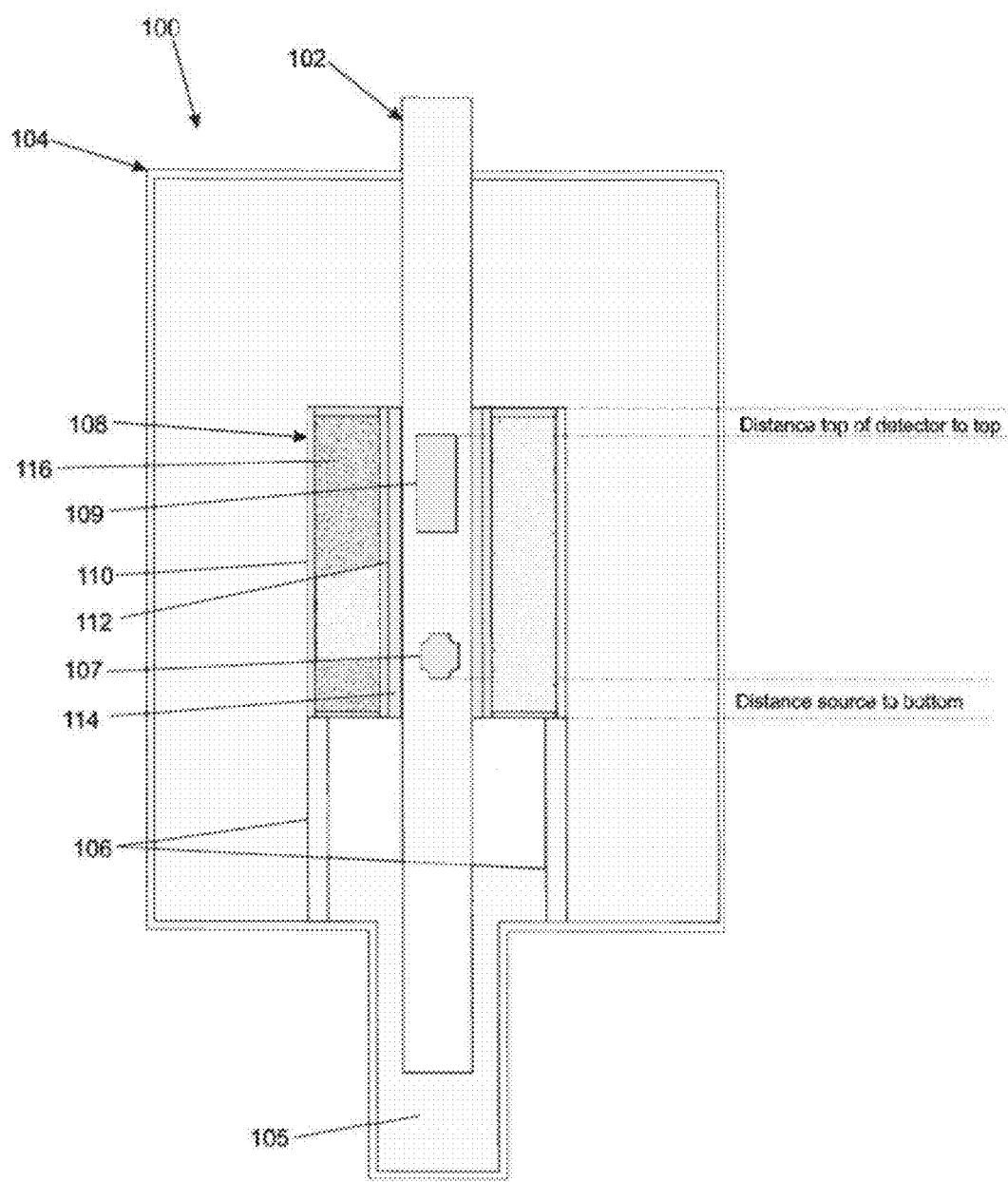
FIG. 1 shows a set up to measure standard spectra using a sleeve inside a large water tank, in accordance with the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. As used herein, the terms "insert" and "sleeve" are equivalent.

With reference to FIG. 1, a test formation 100 for a logging tool 102, such as a downhole nuclear spectroscopy tool, is now described. The logging tool 102 illustratively includes a source 107, such as a nuclear source, and a detector 109. The test formation 100 includes a fluid tank 104, illustratively a water tank, with a rathole 105 to accommodate the logging tool 102 such that the logging tool can be fully inserted into the fluid tank. The fluid tank 104 includes a support 106 therein for supporting an insert apparatus 108, which in turn receives the downhole nuclear spectroscopy tool 102. The insert apparatus 108 includes an exterior liner or shell 110, and an interior liner or borehole liner 112. The inner liner 112 defines a cylindrical borehole 114 to receive the downhole nuclear spectroscopy tool 102.

Formation material 116 is positioned between the exterior liner 110 and interior liner 112. The formation material 116 comprises a base material such as sandstone, limestone, or dolomite, and at least one elemental standards material. The base material may be a material found in formations or a substitute therefor. The formation material 112 may be a composite matrix, and may include ingredients such as sandstone quartz, monazite, acrylics, carbon fiber, and the like.

Figure 2:
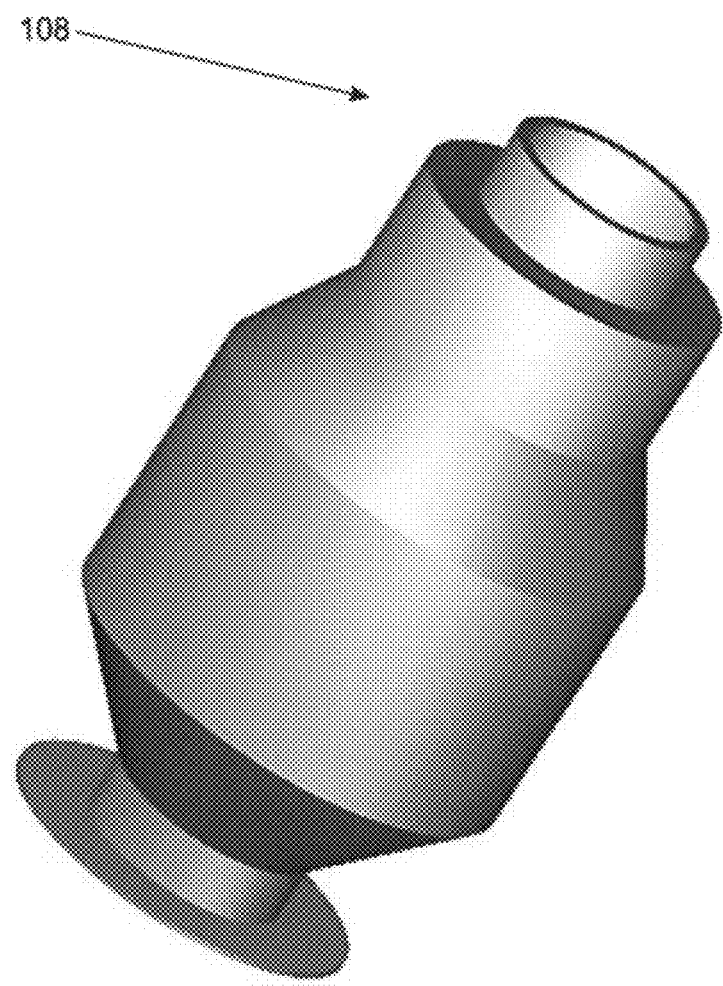
FIG. 2 is a perspective view of an insert apparatus, in accordance with the present disclosure.

While the insert apparatus 108 is shown to have the form a cylinder, it should be understood that it may take other shapes to reduce the amount of material used, to simplify the construction, or to alter the effects of the output. For example, the top and bottom of the insert apparatus 108 could have spherical or conical shape or similar. In some applications, the insert apparatus 108 could have a rectangular or quadratic cross section instead of a circular one. For example, shown in FIG. 2 is a perspective view of an embodiment of the insert apparatus 108 where the outer liner 110 is shaped such that its geometry is adapted to a distribution of nuclei emitting gamma rays.

In use, the logging tool 102 is inserted into the cylindrical borehole 114 so that the source 107 and the detector 109 are both within the insert apparatus 108. The logging tool 102 may be centered or eccentered in the borehole 114. In some cases the fluid in the borehole 114 may be different from the fluid in the tank 104. Such an arrangement may employ seals around the logging tool 102 or a rathole 105 attached to the sleeve itself, as will be appreciated by those of skill in the art.

Once the base material is selected, oxides of additional elements that may occur in similar matrices of real earth formations are then added. The formation material 116 also contains at least one elemental standards material, i.e., at least one material containing an element to be estimated in a formation by nuclear measurements. In some cases, the elemental standard material may be the same as the formation base material. Elements of interest include materials such as sodium, magnesium, manganese, calcium, phosphorus, titanium, sulfur, silicon, aluminum, and the like, which naturally occur in the lithology of earth formations. Compounds used as elemental standards for the test apparatus include, but are not limited to, $MnCO_3$, $CaCO_3$, $CaSO_4$, $MnO_2$, $Na_2CO_3$, $NaHCO_3$, $Ca_2P_2O_2$, $Ca(HPO_4).2H_2O$, $Ca(H_2PO_4)_2$, and the like.

The minimum dimensions of the insert apparatus 108 can be determined through modeling. This is achieved by modeling the spectral response of a specific element in a worst case scenario, in which the migration length of the neutrons is large, i.e. on average the neutrons travel a long distance before being captured by an element in the formation. At the same time, a realistic formation density is used to properly account for the effects of the gamma-ray transport from the location of the neutron capture reaction and the subsequent gamma-ray emission back to the detector. The size of the insert apparatus 108 in the illustrated embodiments was chosen such that the gamma-ray count rate is no less than 80% of the count rate that would be observed in the case of an infinite formation and that the spectral response be indistinguishable from that in an infinite formation.

The effect of the outer diameter of the insert apparatus 108 was simulated using a $MnCO_3$ formation. Of the materials examined, it has one of the longest migration lengths (19.9 cm), indicating fairly deep neutron penetration. Using this material should therefore provide a conservative estimate of the outer diameter of the insert apparatus 108 which will preserve the response of an infinite formation. The calculations assume an infinitely long cylinder of finite thickness. The inner liner 112 and outer liner 110 of the insert apparatus 108 are taken to be 0.5-mm thick AISI type 316 stainless steel. Fresh water fills the space outside the insert apparatus 108 and inside the borehole 114.

Figure 3A:
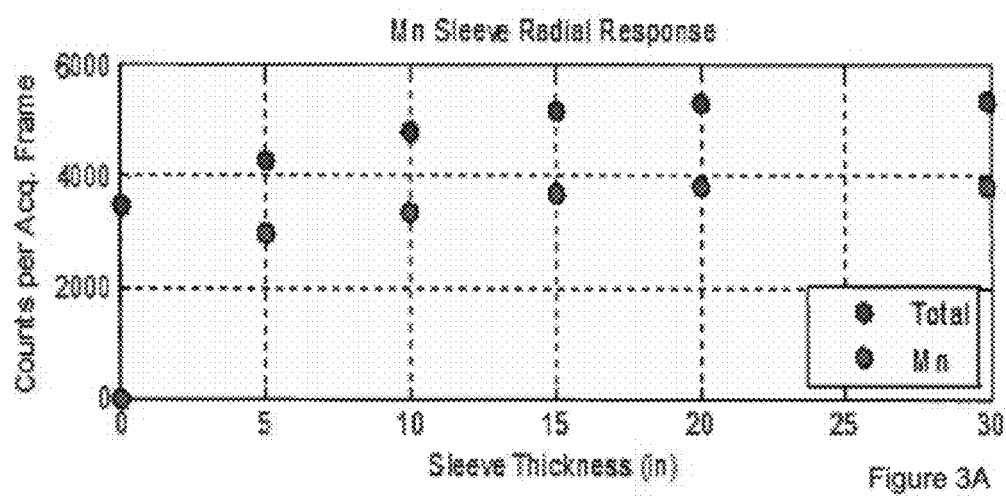
FIG. 3A shows the dependence of counts on the thickness of the sleeve shown in FIGS. 1-2.
Figure 3B:
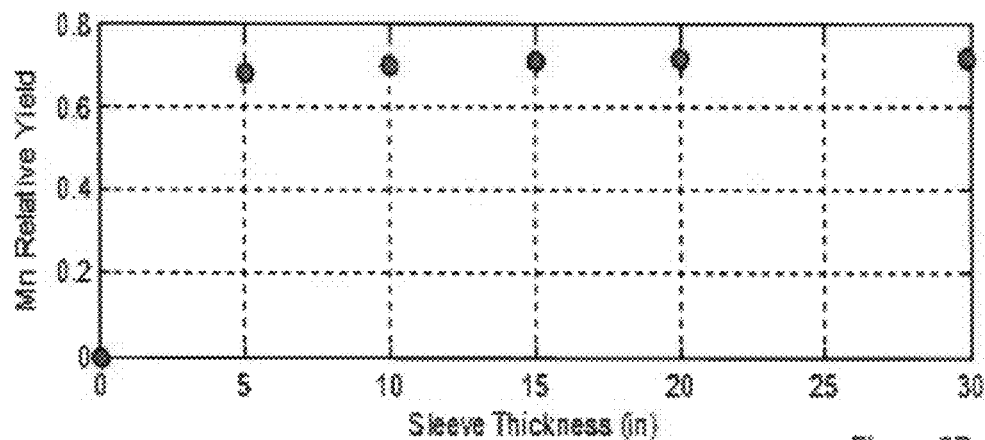
FIG. 3B shows the dependence of relative spectral yield on the thickness of the sleeve shown in FIGS. 1-2.

FIG. 3A shows the computed counts summed over the capture gates of a pulsed neutron tool in a 1.5-9.0 MeV analysis window for various insert apparatus 108 thicknesses. Both the total counts and those due to capture in Mn are shown. Eighty percent of the number of counts in the infinite formation is achieved by around a 13 cm thickness for both cases. The capture gates span the time after the neutron burst during which gamma-rays are generated by neutron capture.

Figure 4A:
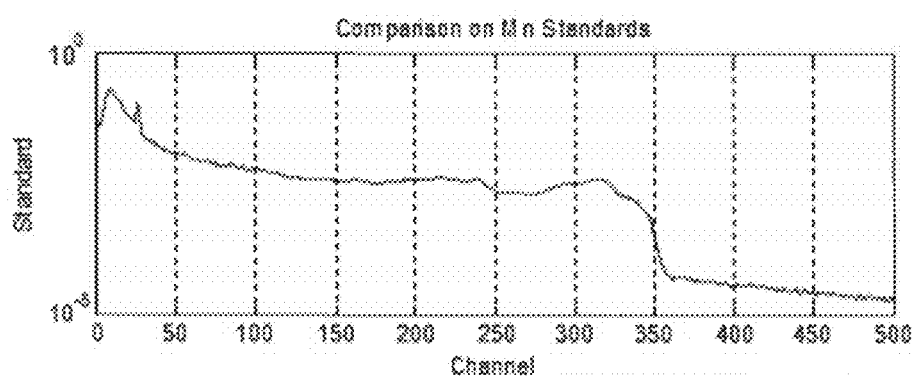
FIG. 4A-4B shows the modeled dependence of the shape of the Mn standard spectrum on the thickness of the sleeve shown in FIGS. 1-2.
Figure 4B:
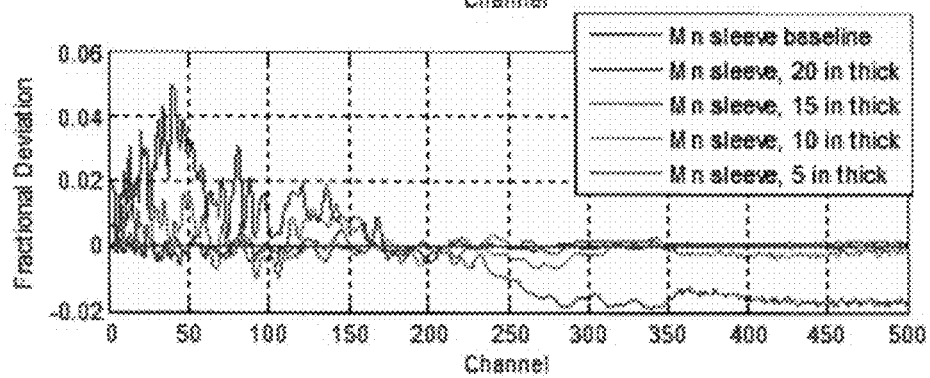

The effect of the insert apparatus 108 thickness on the shape of the Mn standard is shown in FIG. 4A-4B. FIG. 4A shows an overlay of the modeled standards extracted from the different sleeve thicknesses on a semilog scale. No differences are apparent. FIG. 4B shows the fractional deviation of the standards from the infinite-formation case. For sleeves whose thickness is 25.4 cm or larger, the standards in the analysis window (channels 75 to 450) agree to within 1%. The standard derived from the 12.7 cm thick sleeve is systematically low about channel 250 by ~2%.

Based on these calculations, the 25.4 cm thickness is a good size for obtaining a high fraction of the infinite formation counts and yields while ensuring an accurate shape of the standard. If desired, the thickness of the insert apparatus 108 could be reduced to less than 25.4 cm but probably not to less than 12.7 cm.

Similar simulations can be used to determine the axial extent of the insert apparatus 108, i.e. how far the insert apparatus should extend beyond the neutron source and beyond the farthest of the gamma-ray detectors. Minimal distances are about 10 to 20 cm beyond the source 107 and a similar distance beyond the far edge of the scintillator 109 or other gamma-ray detector. This is shown schematically in FIG. 1.

It is desirable for the signal received during the testing to be attributable to the elemental standards material in the formation fill and not to other materials. It is undesirable for the outer liner 110 or the inner liner 112 of the insert apparatus 108 to contribute much to the signal, and for practical reasons, these liners may be made from sheet materials. In one embodiment, the exterior of the outer liner 110 and the inner liner 112 are formed from materials which do not interfere with the desired materials standard. The materials of the outer liner 110 and inner liner 112 may be the same or different. Useful materials for the outer liner 110 and inner liner 112 include such materials as high molecular weight polyethylene and stainless steel. One useful stainless steel is AISI type 316, for example.

The volume of investigation in spectroscopic measurements depends on the type of measurement (capture, inelastic or activation) and the properties of the formation, and this observation has implications for how depth of investigation, vertical resolution, and measure points are defined and how the response in general may be understood.

Some examples of formation materials 116 used in the inserts 108 include:

Gd/Sm: 7.5 ppm Gd (III) oxide, 9.0 ppm Sm (III) oxide, approximately 64 vol % $SiO_2$, and the balance being fresh water Ti: 10 vol % $TiO_2$, 54 vol % $Al_2O_3$, and the balance being fresh water Na: Maximum load of $NaHCO_3$ powder in a polyethylene matrix Mn: 1.9 vol % $MnO_2$, 62.1 vol % $SiO_2$, and the balance being fresh water P: Calcium pyrophosphate ($Ca_2P_2O_7$) in fresh water, approximately 36 p.u.

Al sensitivity: 35 vol % $Al_2O_3$, 29 vol % $SiO_2$, and the balance fresh water.

Si: Quartz sand and fresh water, approximately 36 p.u.

Al: Aluminum oxide and fresh water, approximately 36 p.u.

A first example is now described. For the purposes of this modeling study, the sandstone/acetate (Gd and Sm acetate) solution was chosen as the fill material 116. The relative concentration of Gd and Sm was chosen to be 1.3 by weight to reflect the natural relative abundance. The porosity was chosen to be 16 p.u., the same porosity as the other known mid-porosity sandstone formations. The amount of Gd was chosen to simulate the macroscopic thermal neutron capture cross section (Sigma) of 200 ppk saltwater. This represents a 0.40 vol % Gd acetate/0.33 vol % Sm acetate solution. The macroscopic capture cross section of the complete mixture is 90.9 cu.

Figure 5A:
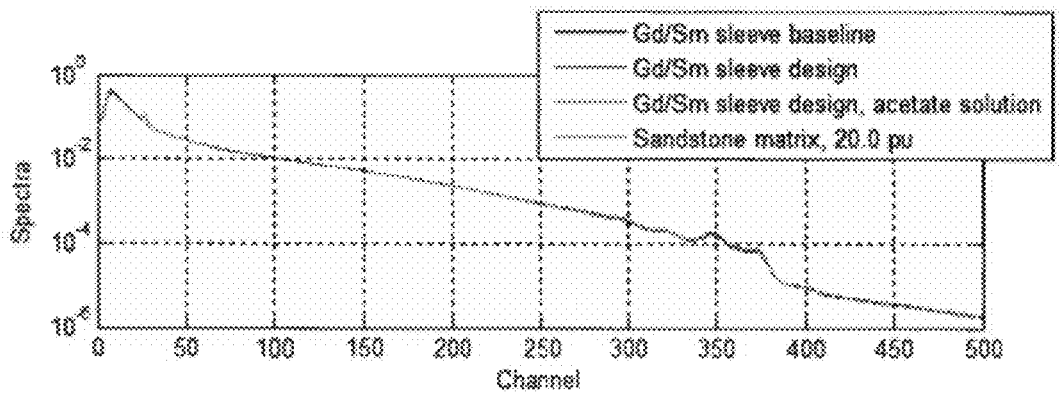
FIG. 5A shows spectra of Gd/Sm tests performed using the insert apparatus of FIGS. 1-2 and a prior large sandstone formation containing Gd/Sm.
Figure 5B:
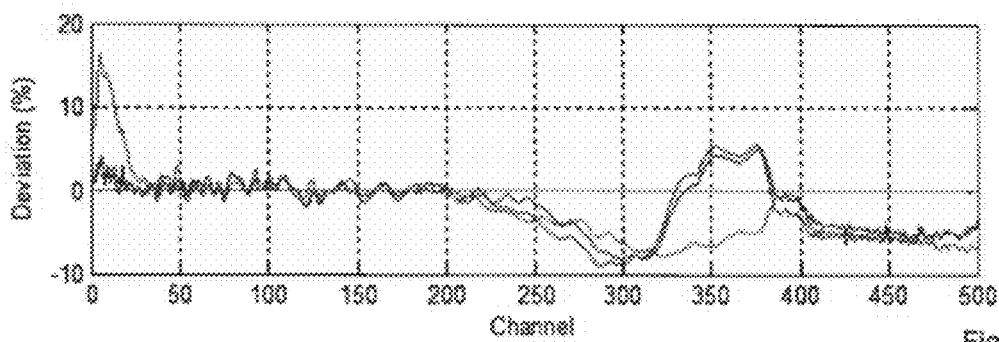
FIG. 5B shows a graph of deviations with respect to the sandstone test of FIG. 5A in percent.
Figure 5C:
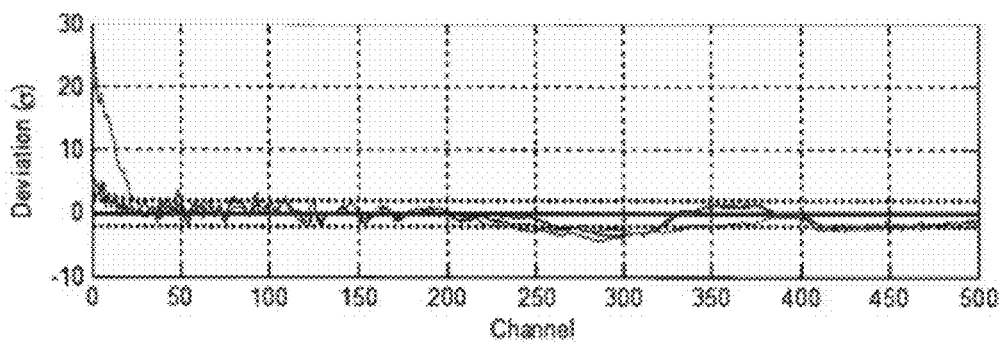
FIG. 5C shows a graph of deviation with respect to the sandstone test of FIG. 5A with respect to the statistical significance of the differences.

The combined yield of Gd and Sm shown in this configuration is 74% of the total thermal capture gamma-ray yield, indicating a very good signal-to-noise ratio. The shape of the extracted standard compared to the one from the (infinite) sandstone test formation is shown in FIG. 5A-5C. Visually, the spectra are indistinguishable, as shown in FIG. 5A. Quantitatively, the deviation of the standard extracted from the sleeve design compared to the one from the test case is generally small, as shown in FIGS. 5B-5C. Large deviations occur between channels 250 to 400 (5-8 MeV), but the statistical significance of the deviation is of concern merely around channel 300 (6 MeV). Similar deviations occur for an infinite sandstone/Gd/Sm acetate formation and for a pure Gd/Sm acetate-filled sleeve. The latter material also shows very large spectral differences below about 0.5 MeV. These energies are below the analysis window that may be used for the analysis of neutron induced gamma-ray spectroscopy downhole.

Various techniques involved in methods making the test formations described herein include modeling the radiation transport throughout the insert 108 geometry, computing yields and spectra arising from detected gamma rays produced by neutron interactions with user-specified nuclei in user-specified regions, and comparing through modeling the shape of the detected gamma ray spectra derived from specific elements and regions to the corresponding shape produced by the elements in an infinite formation. The techniques also include producing a map of the distribution of the nuclei that generate specific detected gamma rays, and choosing the component materials in the insert and their proportions to optimize the spectral shape or yields of the detected gamma rays. Particular quantities of interest, which may be varied, include slowing down length, thermal neutron capture cross section, nuclear or electron density, and/or photoelectric factor of the component materials and their mixture.

This also includes choosing the materials out of which the insert and, in particular, the borehole liner are made to reduce the contribution of unwanted gamma rays to the detected spectrum. Prior efforts often relied on thin stainless steel to reduce this signal, but other materials such as ultra-high molecular weight polyethylene, acrylic, carbon fiber, or in general any material containing carbon, hydrogen, and oxygen may be used, since neither C nor O will contribute to the neutron capture gamma-ray spectrum and hydrogen has a very well defined standard spectrum and it is easy to remove the contribution from the total spectrum. If the goal is to determine the gamma-ray spectra from inelastic interactions, it may be preferable to avoid materials containing carbon (oxygen is present in the vast majority of materials and will often be present).

Figure 6:
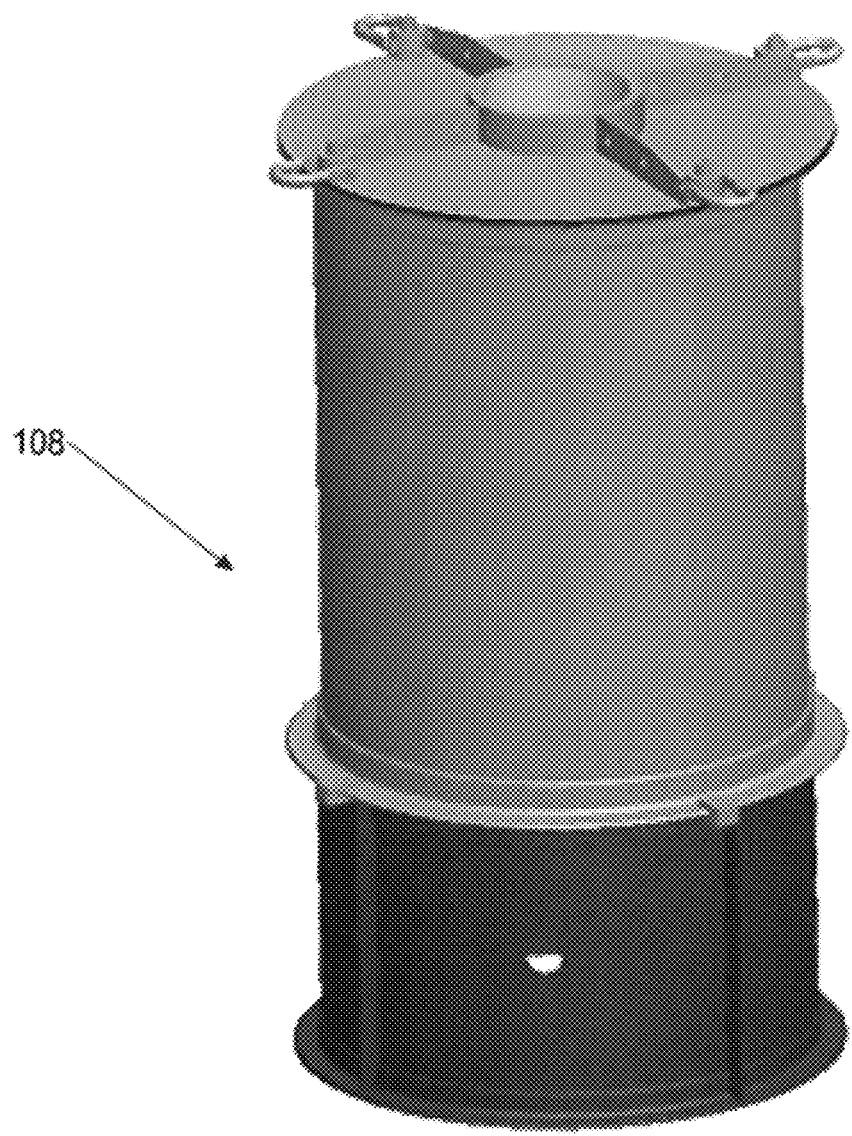
FIG. 6 shows a perspective view of another insert apparatus, in accordance with the present disclosure.

The methods may also include adapting the shape of the insert 108 to the distribution of the nuclei generating the gamma rays of interest. Simple examples are right circular cylinders, shown in FIG. 6, and spheres. More complicated surfaces can be considered such as the tank shown in FIG. 2. The latter shape allows a reduction in the volume of formation materials at the expense of a more complex geometry and construction.

Once the geometry of the insert 108 has been determined and the liner materials have been selected, filling the insert with the formation material 116 designed to achieve the desired nuclear properties is of great importance. The formation material 116 may be in the form of a matrix, and may include a plurality of powdered or granular materials encased in a volume-filling binder such as water, oil, polyethylene, emulsified polyethylene, some other polymer, although, again any material containing C, H, and O (and in some applications, only C, H, and O) can be used. Solid or hollow cylinders, spheres, shells, or layers of one material within another may be added as well.

Materials should be chosen for the insert 108 and its contents should be selected so that the result remains stable and does not leak or otherwise change over a 10-20 year lifetime. One aspect of this choice is the selection of appropriate O-rings in the fluid tank 104 which do not suffer degradation after exposure to the chemicals in the insert 108 or to the radiation emitted during measurements with the fluid tank. In some applications, the fluid tank 104 could be welded shut once its construction is finished.

In the embodiments disclosed herein, the volume of the insert 108, and hence its mass, can be reduced by approximately a factor of eight compared to a quasi-infinite full size formation. This reduction significantly decreases the cost of the insert 108 relative to a complete formation. It allows the use of higher purity materials than would otherwise be possible. The techniques used to design the insert 108 can also be employed to engineer inserts for specific purposes that would be difficult or impossible with quarried rock. The smaller dimensions and mass of the inserts 108 also alleviate many of the problems associated with lifting and storing them. It should be noted that the same approach may be applicable to the construction of test formations for the characterization of natural gamma-ray spectroscopy tools.

The inserts 108 disclosed herein are useful with nuclear downhole tools, as stated above. Such instruments and more recent improved implementations thereof, include an accelerator type source of neutrons that emits controlled duration bursts of high energy neutrons into the formations surrounding a wellbore. One or more scintillation type radiation detectors are arranged in the instrument to detect gamma rays resulting from interactions of the neutrons with the surrounding formations. In order for such instruments to provide measurements that are closely representative of the properties of the surrounding formations, it is desirable to shield the one or more radiation detectors from both direct emission of neutrons from the source and from neutrons that interact with the formations and the materials in the wellbore. Such neutrons may cause events in the radiation detectors that are not related to the properties of the formations desired to be evaluate.

While the embodiments described above relate to the use of a pulsed neutron source in the tool 102 to irradiate the formation, the approach is equally applicable to the use of radioisotopic sources such as $^{241}$AmBe or $^{252}$Cf. In addition, as mentioned previously, the approach is also applicable to the measurement of standard spectra for natural gamma-rays such as those from $^{238}$U, $^{232}$Th and $^{40}$K and by extension to spectra from other radioisotopes that could be found in materials due to contamination as may be encountered after nuclear spills etc. Additionally, the approach also applies to the measurement of gamma-ray spectra from neutron activation, see for example, WO Publication 2010/002727, incorporated herein by reference.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. An insert apparatus for use in a test formation for a downhole tool comprising:

an outer liner;

an inner liner defining a cylindrical borehole having a diameter such that the downhole tool is receivable therein;

fill material between the outer liner and the inner liner, the material comprising a formation base material and an elemental standards material;

wherein the outer liner, the inner liner, and the fill material are configured such that a gamma ray elemental standard measurement derived from a test using the insert apparatus is equivalent to an elemental standard measurement from a selected formation with the same composition;

wherein the elemental standards material is selected from the group consisting of $MnCO_3$, $CaSO_4$, $MnO_2$, $Na_2CO_3$, $NaHCO_3$, $Ca_2P_2O_7$, $Ca(HPO_4).2H_2O$, $Ca(H_2PO_4)_2$, MgO, dolomite, $TiO_2$, elemental S, hematite, magnetite, quartz, gadolinium oxide, gadolinium acetate, samarium acetate, samarium oxide, potassium acetate, and barium sulfate.

2. An insert apparatus according to claim 1 wherein the elemental standards material and the formation base material each comprise a same material.

3. An insert apparatus according to claim 1 wherein the elemental standards material comprises material different from the formation base material.

4. An insert apparatus according to claim 1 wherein the formation base material is selected from a material comprising at least one of carbon, hydrogen and oxygen.

5. An insert apparatus according to claim 1 wherein the formation base material is selected from the group consisting of sandstone, limestone, and dolomite.

6. An insert apparatus according to claim 1 wherein at least one of the outer liner and the inner liner are formed of steel.

7. An insert apparatus according to claim 1 wherein at least one of the outer liner and the inner liner are formed of polyethylene.

8. An insert apparatus according to claim 1 wherein the outer liner and the inner liner are formed of a same material.

9. An insert apparatus according to claim 1 wherein the elemental standards material is present in particulate form.

10. An insert apparatus according to claim 1 wherein the elemental standards material is present in a fluid in pores between particulates of the formation material.

11. An insert apparatus according to claim 1 wherein the selected formation comprises one of an actual earth formation and an infinite homogeneous formation.

12. A test formation for a downhole nuclear spectroscopy tool comprising:

a fluid tank;

a support within the fluid tank; and an insert apparatus positioned within the fluid tank and carried by the support, the insert apparatus comprising an outer liner, an inner liner defining a cylindrical borehole having a diameter such that the downhole nuclear spectroscopy tool is receivable therein, and fill material between the outer liner and the inner liner, the fill material comprising at least at least one formation base material and at least one elemental standards material, wherein the outer liner, the inner liner, and the fill material are configured such that a gamma ray elemental standard measurement derived from a test using the insert apparatus is equivalent to an elemental standard measurement from a selected formation with the same composition, wherein the elemental standards material is selected from the group consisting of $MnCO_3$, $CaSO_4$, $MnO_2$, $Na_2CO_3$, $NaHCO_3$, $Ca_2P_2O_7$, $Ca(HPO_4).2H_2O$, $Ca(H_2PO_4)_2$, MgO, dolomite, $TiO_2$, elemental S, hematite, magnetite, quartz, gadolinium oxide, gadolinium acetate, samarium acetate, samarium oxide, potassium acetate, and barium sulfate.

13. An insert apparatus according to claim 12 wherein the downhole nuclear spectroscopy tool has a nuclear source spaced apart from a far detector; and wherein the outer liner has a cylindrical section spanning from the nuclear source of the tool to the far detector of the tool, and first and second half-shell sections above and below the cylindrical section.

14. An insert apparatus according to claim 12 wherein the at least one formation base material is selected from a material comprising at least one of carbon, hydrogen and oxygen.

15. An insert apparatus according to claim 12 wherein the at least one formation base material is selected from the group consisting of sandstone, limestone, and dolomite.

16. An insert apparatus according to claim 12 wherein the at least one elemental standards material is present in particulate form.

17. An insert apparatus according to claim 12 wherein the at least one elemental standards material is present in a fluid in pores between particulates of the at least one formation material.

18. An insert apparatus according to claim 12 wherein the selected formation comprises one of an actual earth formation and an infinite homogeneous formation.

19. A method of testing a downhole tool comprising:

positioning the downhole nuclear spectroscopy tool in an insert apparatus, the insert apparatus comprising an outer liner, an inner liner defining a cylindrical borehole having a diameter such that the downhole nuclear spectroscopy tool is receivable therein, fill material between the outer liner and the inner liner, the fill material comprising a formation base material and an elemental standards material;

positioning the insert apparatus into a fluid reservoir filled with a fluid; and performing test measurements on the insert apparatus using the downhole nuclear spectroscopy tool, wherein the test measurements are such that a gamma ray elemental standard measurement derived from a test using the insert apparatus is equivalent to an elemental standard measurement from a selected formation with the same composition due to a configuration of the outer liner, the inner liner, and the fill material;

wherein the elemental standards material is selected from the group consisting of $MnCO_3$, $CaSO_4$, $MnO_2$, $Na_2CO_3$, $NaHCO_3$, $Ca_2P_2O_7$, $Ca(HPO_4).2H_2O$, $Ca(H_2PO_4)_2$, MgO, dolomite, $TiO_2$, elemental S, hematite, magnetite, quartz, gadolinium oxide, gadolinium acetate, samarium acetate, samarium oxide, potassium acetate, and barium sulfate.

20. A method according to claim 19 wherein the formation base material is selected from a material comprising at least one of carbon, hydrogen and oxygen.

21. A method according to claim 19 wherein the formation base material is selected from the group consisting of sandstone, limestone, and dolomite.

22. A method according to claim 19 wherein the elemental standards material is present in particulate form.

23. A method according to claim 19 wherein the elemental standards material is present in a fluid in pores between particulates of the formation material.

24. A method according to claim 18 wherein the selected formation comprises one of an actual earth formation and an infinite homogeneous formation.

25. A method according to claim 18 wherein the test measurements include at least one of a capture gamma-ray spectra, an inelastic gamma-ray spectra, a natural gamma-ray spectra, an activation spectra, and a non-natural gamma-ray spectra.

\* \* \* \* \*